May 7, 1968   KASHICHI HIROTA   3,381,873
PLASTIC EGG CONTAINER
Filed March 2, 1966

INVENTOR.
KASHICHI HIROTA
BY
Buckman and Archer
HIS ATTORNEYS

United States Patent Office 3,381,873
Patented May 7, 1968

3,381,873
PLASTIC EGG CONTAINER
Kashichi Hirota, 691 Sanda-Higashi-cho,
Hachioji-shi, Tokyo, Japan
Filed Mar. 2, 1966, Ser. No. 531,165
Claims priority, application Japan, Aug. 31, 1965,
40/71,405
7 Claims. (Cl. 229—2.5)

ABSTRACT OF THE DISCLOSURE

This is a container having oppositely disposed airtight chambers with cavities for completely enclosing an egg. The cavities have protuberances for resiliently holding the egg off the walls thereof.

The present invention relates to a plastic container for storing and transporting eggs, and more particularly, to a plastic egg container by which eggs can be transported without any risk of damage.

An object of the present invention is to provide a plastic egg container having means for pneumatically absorbing external shock loads so as to prevent any damaging of eggs.

It is a further object of the present invention to provide, in a plastic egg container, means for holding eggs so as to prevent any free movement thereof.

It is another object of the present invention is to provide a sealed air chamber in each of the case and the lid of the plastic egg container for absorbing external shock loads by the cushioning effect of the air confined in said chambers.

These and further objects and advantages of the present invention will become apparent from the following descriptions taking reference to the accompanying drawings illustrating a preferred embodiment, in which.

Figure 1:
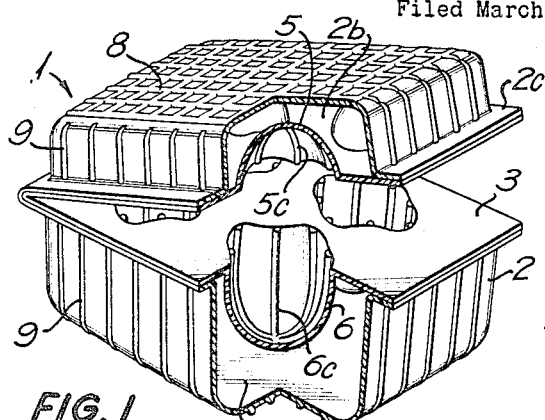
FIG. 1 is a perspective view of a novel egg container in partially opened position, said container being shown with some portions broken away so as to illustrate the box construction in more detail.

Referring now to the drawings, the egg container 1 in accordance with the present invention comprises an outer member 2 and an inner member 3 each of which is made of a thin plastic material.

Figure 2:
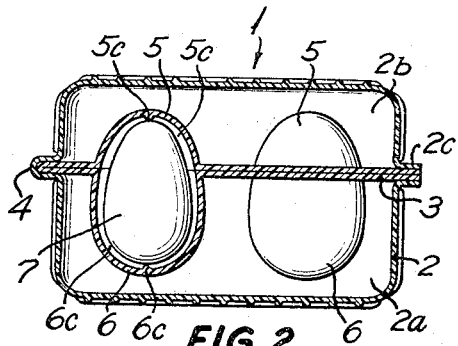
FIG. 2 is a cross-sectional view of the container in fully closed position.

The outer member 2 is formed with a pair of cavities 2a and 2b which are disposed in symmetrical relation with each other about the transverse fold line 4 so as to be opposed to define a closed chamber when the member 2 is folded at the fold line 4 into fully closed position as shown in FIG. 2. Around the cavities 2a and 2b, there is formed a peripheral flange 2c on which the inner member 3 is airtightly sealed to form a pair of air cushion chambers by the cavities 2a and 2b.

The inner member 3 is formed with one or more (four in the illustrated example) pairs of recesses 5 and 6. In each pair, the recesses 5 and 6 are located symmetrically with each other about the fold line so as to be mated at their openings when the member 3 is folded as shown in FIG. 2. Each pair of recesses 5 and 6 form, when mated at their openings, a substantially ellipsoidal space for accommodating an egg 7.

Figure 3:
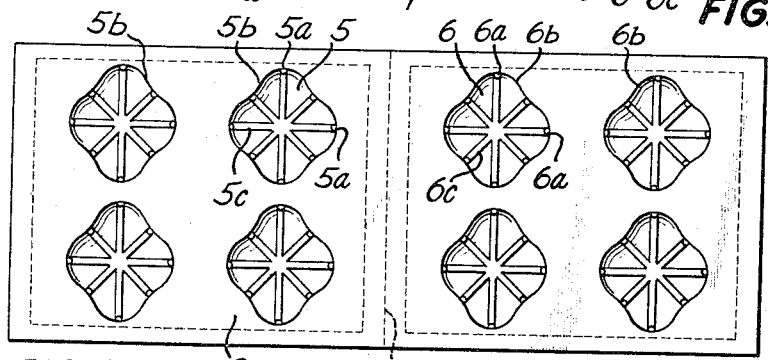
FIG. 3 is a top plan view of the container in fully opened position.
Figure 4:
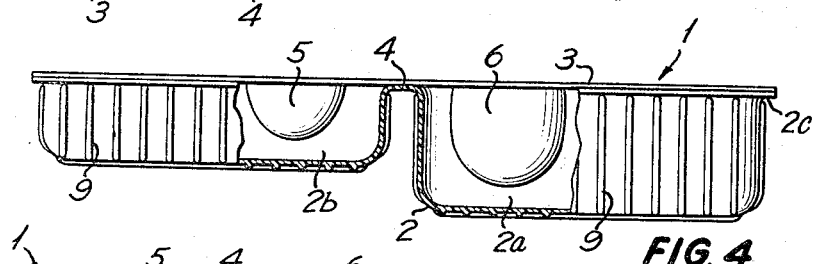
FIG. 4 is a partially broken side elevation of the container shown in FIG. 3.
Figure 5:
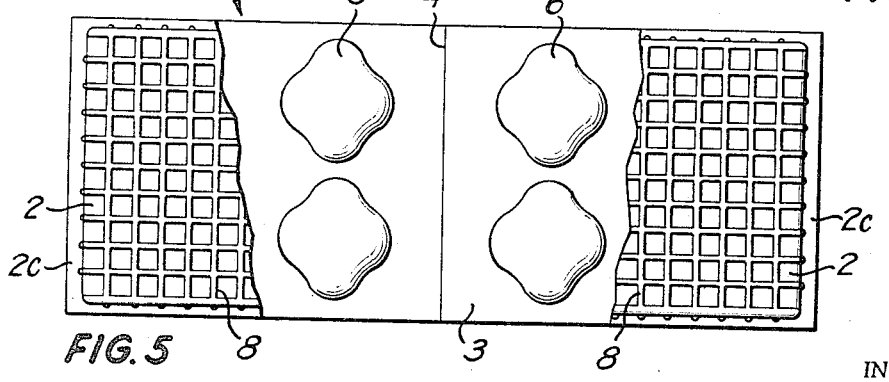
FIG. 5 is a partially broken bottom view of the container shown in FIGS. 3 and 4.

As shown in FIG. 3, the openings of the recesses 5 and 6 is substantially diamond-shaped with rounded corner portions 5a and 6a and inwardly curved sides 5b and 6b. Each of said recesses 5 or 6 is further provided on its inner surface with a plurality of elongated protuberances 5c or 6c which intersect with each other at the bottom portion of the recess.

In the preferred embodiment illustrated in the drawings, the recess 6 is deeper than the recess 5, the ratio of the depths of the recesses 6 and 5 being 7:3. By selecting the depths of the recesses 5 and 6 as described, the egg 7 is stably held in the recess 6 even when the container is opened.

In the container as described above, when an egg is inserted into the recess 6 and the lid portion of the container is put on the case portion by folding the container along its fold line 4 so as to envelop the upper portion of the egg by the recess 5, the sides 5b and 6b of the openings and the protuberances 5c and 6c are deflected, the amounts of the deflections being dependent on the size of the egg. Thus, the egg is held in the space defined by the recesses 5 and 6 without any play.

The outer member 2 is formed on its external top and bottom surfaces with lattice-like beadings 8 and on its external side surfaces with vertically extending parallel beadings 9 in order to increase the rigidity of the container 1.

In use, the eggs 7 are inserted into the recess 6 of the inner member 3 and the container is closed as shown in FIG. 2, whereby each egg 7 is stored within the space defined by the recesses 5 and 6. Since the inwardly curved sides 5b and 6b and the protuberances 5c and 6c of the recesses 5 and 6 are deflected so as to fit the egg 7 inserted therein, the egg 7 is held without any play in the space defined by the recesses 5 and 6, and thus the risk of damaging the egg 7 due to its movement within said space is substantially decreased. Further, the inner member 3 airtightly sealed to the flange 2c of the outer member 3 forms two closed airtight chambers at the recesses 2a and 2b. As shown in FIG. 2, eggs are suspended between these airtight chambers 2a and 2b so that any shock load imparted to the container 1 is substantially absorbed by the air chambers 2a and 2b whereby damaging of eggs during storage or transportation thereof is effectively avoided.

The details of the structure may be modified substantially without departing from the spirit of the invention and such modifications as come within the scope of appended claims are contemplated.

What is claimed is:

1. A plastic egg container comprising an outer member formed with a pair of cavities which are located symmetrically with each other about the fold line of the container leaving a peripheral flange around said cavities, and an inner member airtightly sealed to said flange to form a pair of airtight chambers at said pair of cavities, said inner member being formed with at least one pair of recesses symmetrically located about said fold line, said pair of recesses being so formed that, when said members are folded at the fold line and said recesses are opposingly mated at their openings, they define a substantially ellipsoidal completely enclosed space for accommodating an egg, and said inner member in folded condition forming a closely butted joint across the mating surfaces.

2. A plastic egg container in accordance with claim 1, wherein the opening of each recess is substantially diamond shaped with rounded corner and inwardly curved sides dimensioned to flexibly bear against said egg.

3. A plastic egg container in accordance with claim 1, wherein each of said recesses is provided with at least one deflectable protuberance adapted to be deflected upon insertion of an egg so as to exclude any play of the egg within said ellipsoidal space.

4. A plastic egg container in accordance with claim 1, wherein the ratio of the depths of said pair of recesses is approximately 7:3.

5. A plastic egg container in accordance with claim 1, wherein said members are made of thin plastic material and said outer member is provided with reinforcement beads.

6. An egg container comprising an outer member of thin plastic material which is formed with reinforcement beadings on its outer surface and provided with a pair of cavities located symmetrically with each other about the fold line of the container leaving a peripheral flange around said cavities, and an inner member of thin plastic material which is airtightly sealed to said flange to form a pair of airtight chambers at said pair of cavities, said inner member being formed with at least one pair of recesses symmetrically located about said fold line, said pair of recesses being so formed that, when said members are folded at the fold line and said recesses are opposingly mated at their openings, they define a substantially ellipsoidal completely enclosed space for accommodating an egg, the opening of each recess being substantially diamond-shaped with rounded corner and inwardly curved sides, each of said recess being provided with at least one deflectable protuberance adapted to be deflected upon insertion of an egg so as to exclude any play of the egg within said ellipsoidal space, and the ratio of the depths of said pair of recesses being approximately 7:3.

7. An egg container in accordance with claim 6, wherein said deflectable protuberance makes contact with said egg along a line longitudinally disposed on said egg.

References Cited
UNITED STATES PATENTS

| | | | |
|---|---|---|---|
| 3,128,030 | 4/1964 | Davies | 229—2.5 |
| 3,131,846 | 5/1964 | Whiteford | 229—29 |
| 3,192,978 | 7/1965 | Hovath | 150—015 |

DAVID M. BOCKENEK, *Primary Examiner.*

UNITED STATES PATENT OFFICE
CERTIFICATE OF CORRECTION

Patent No. 3,381,873                                          May 7, 1968

Kashichi Hirota

It is certified that error appears in the above identified patent and that said Letters Patent are hereby corrected as shown below:

In the heading to the printed specification, lines 3 and 4, "691 Sanda-Higashi-cho, Hachioji-shi, Tokyo, Japan" should read -- Tokyo, Japan, assignor to Kyowa Denki Kagaku Kabushiki Kaisha, Tokyo, Japan, a corporation of Japan --.

Signed and sealed this 2nd day of December 1969.

(SEAL)
Attest:

Edward M. Fletcher, Jr.                          WILLIAM E. SCHUYLER, JR.
Attesting Officer                                       Commissioner of Patents